(12) United States Patent
Eslambolchi et al.

(10) Patent No.: US 6,808,116 B1
(45) Date of Patent: Oct. 26, 2004

(54) FIBER JUMPERS WITH DATA STORAGE METHOD AND APPARATUS

(75) Inventors: Hossein Eslambolchi, Los Altos Hills, CA (US); John Sinclair Huffman, Conyers, CA (US)

(73) Assignee: AT&T Corp., New York, NY (US)

( * ) Notice: Subject to any disclaimer, the term of this patent is extended or adjusted under 35 U.S.C. 154(b) by 28 days.

(21) Appl. No.: 10/158,281

(22) Filed: May 29, 2002

(51) Int. Cl.[7] .............................................. G06K 19/06
(52) U.S. Cl. ................................... 235/492; 235/375
(58) Field of Search .............................. 235/492, 375, 235/380, 385, 451, 462.13

(56) References Cited

U.S. PATENT DOCUMENTS

| | | | | |
|---|---|---|---|---|
| 5,394,503 A | * | 2/1995 | Dietz, Jr. et al. | 385/135 |
| 5,563,402 A | * | 10/1996 | Reddersen et al. | 235/436 |
| 5,673,037 A | * | 9/1997 | Cesar et al. | 235/385 |
| 5,781,990 A | * | 7/1998 | Seidler et al. | 29/825 |
| 5,937,130 A | * | 8/1999 | Amberg et al. | 385/134 |
| 5,955,950 A | * | 9/1999 | Gallagher, II et al. | 340/572.1 |
| 6,556,754 B2 | * | 4/2003 | Shoemaker et al. | 385/121 |
| 6,588,938 B1 | * | 7/2003 | Lampert et al. | 385/58 |

FOREIGN PATENT DOCUMENTS

| | | | | |
|---|---|---|---|---|
| GB | 2250389 | * | 3/1992 | G09F/3/02 |

* cited by examiner

Primary Examiner—Daniel St. Cyr

(57) ABSTRACT

A method and apparatus for identifying fiber optic jumper cables is presented. A radio-frequency identification system is presented in which a tag is placed in an ST connector. The tag includes a memory storing jumper cable identification information. The jumper cable identification information identifies the jumper cable. A radiating unit radiates the tag with electromagnetic waves and the tag is energized. Once energized, the tag communicates the jumper cable identification information located in the memory to the radiating unit. The radiating unit then displays the jumper cable identification information. As such, a technician is able to identify a jumper associated with the connector and connect the jumper to an appropriate communications bay.

12 Claims, 2 Drawing Sheets

FIBER JUMPERS WITH DATA STORAGE METHOD AND APPARATUS

BACKGROUND OF THE INVENTION

1. Field of the Invention

This invention relates to infrastructure. Specifically, the present invention relates to cable infrastructure.

2. Description of the Related Art

Modern communications systems include electronics linked by wired connections and wireless connections. Wired communications links are typically implemented with cabling such as twisted pair cabling, coaxial cabling and fiber-optic cabling. The cabling is run between end electronics to facilitate the communication of information.

Fiber-optic cabling has become the medium of choice for use on communications links. Fiber-optic cabling typically facilitates faster, higher bandwidth communications. A fiber-optic communications link may be implemented with two fibers, one for transmit signals and a second for receive signals. Since the fiber-optic cable accomplishes communications with light, special termination devices (e.g. connectors) are fused at the end of the cable to connect the cable to termination equipment (e.g. cabinets, electronics devices).

In a conventional communications system, a long-haul fiber optic link is first terminated in a termination cabinet or bay. The termination cabinet is often used to interface the long haul cabling with end electronics. Shorter fiber optic cables known as jumpers are often used to make connections between the termination cabinets or bays and the end electronics. The jumpers consist of a fiber and two connectors, one on each end.

The jumpers are used to bridge communications links. For example, one bay may house electronics, which is connected to a long-haul cable that provides a connection to the east coast. Another bay may house electronics, which is connected to a long-haul cable that provides a connection to the west coast. A fiber jumper may be used to bridge the communications from the first bay to the second bay. As a result, communication is facilitated between the east coast and the west coast.

As a result of the massive explosion of communications systems, the number of communication links and as a result, the number of bays connected by fiber jumpers has significantly increased. It is not uncommon to have a row of bays at a facility, with each bay terminating 144 fiber connectors (e.g. the ends of fiber jumpers).

The fiber jumpers are typically labeled with source and destination information. Labeling the fiber jumpers is a critical task because with so many jumpers located in a bay, it is easy to make a mistake and connect the jumpers to the wrong receptacle in the bay. This would have disastrous consequences since the jumpers connect communications end-points. Connecting the wrong end-points could result in the misdirection or the interruption of service for a large number of end-users.

It is not uncommon for technicians working with fiber jumpers to forget to label the fiber jumpers. In addition, the fiber jumpers may be labeled incorrectly or inconsistently. Further, labels may fall off of the fiber jumpers, be obscured by dirt or just wear off of the jumpers. When there are labeling problems, the technician has to take additional steps to make sure that they do not patch the fiber jumpers into the wrong receptacles. For example, the technician may have to perform testing and transmit test signals to make sure that the proper connections are being made.

Thus there is a need in the art for a better method of identifying and labeling fiber jumpers. There is a need for a better method of associating fiber jumpers with their respective termination points. Lastly, there is a need in the art for a method that will avoid the problems associated with the labeling system, such as lack of labeling, mislabeling and damage to labels caused by the wear and tear of labels.

SUMMARY OF THE INVENTION

A method of identifying cables is presented. A tag consisting of a transponder and an associated memory is housed in connectors, located on the ends of a fiber jumper. Jumper information is stored in the memory. A radiating unit (e.g. a reader) including an antenna and a computer is provided. Electromagnetic waves are generated out of the antenna and directed towards the tag. The tag is energized by the electromagnetic waves and the jumper information is communicated out of the transponder back to the radiating unit. Processing of the jumper information is then performed in the radiating unit.

In one embodiment of the present invention a fiber-optic termination device comprises a transponder receiving a signal; and a memory storing information and coupled to the transponder, the memory communicating the information to the transponder, in response to the transponder receiving the signal, the transponder responding to the signal with the information communicated by the memory.

A method of identifying a jumper comprises the steps of positioning a terminating apparatus including a tag, the tag storing information; radiating the terminating apparatus tag causing the tag to communicate the information; receiving the information with a reader; and displaying the information in response to receiving the information with the reader.

A method of operating a fiber connector comprises the steps of receiving electromagnetic waves in the fiber connector, the fiber connector including a tag, the tag including a memory associated therewith, the memory storing information; energizing the tag in response to receiving the electromagnetic waves; accessing the memory in response to energizing the tag; and communicating the information in response to accessing the memory.

A method of identifying a jumper comprises the steps of directing signals toward a connector to the jumper, the connector including a tag with a memory associated therewith, the memory storing information, wherein the tag is energized in response to receiving the signals and information is communicated from the memory in response to energizing the tag; receiving the information communicated from the tag; and displaying the information in response to receiving the information communicated from the tag.

A connector comprises a tag, the tag including a memory associated therewith, the memory storing information.

DESCRIPTION OF THE INVENTION

Figure 1:
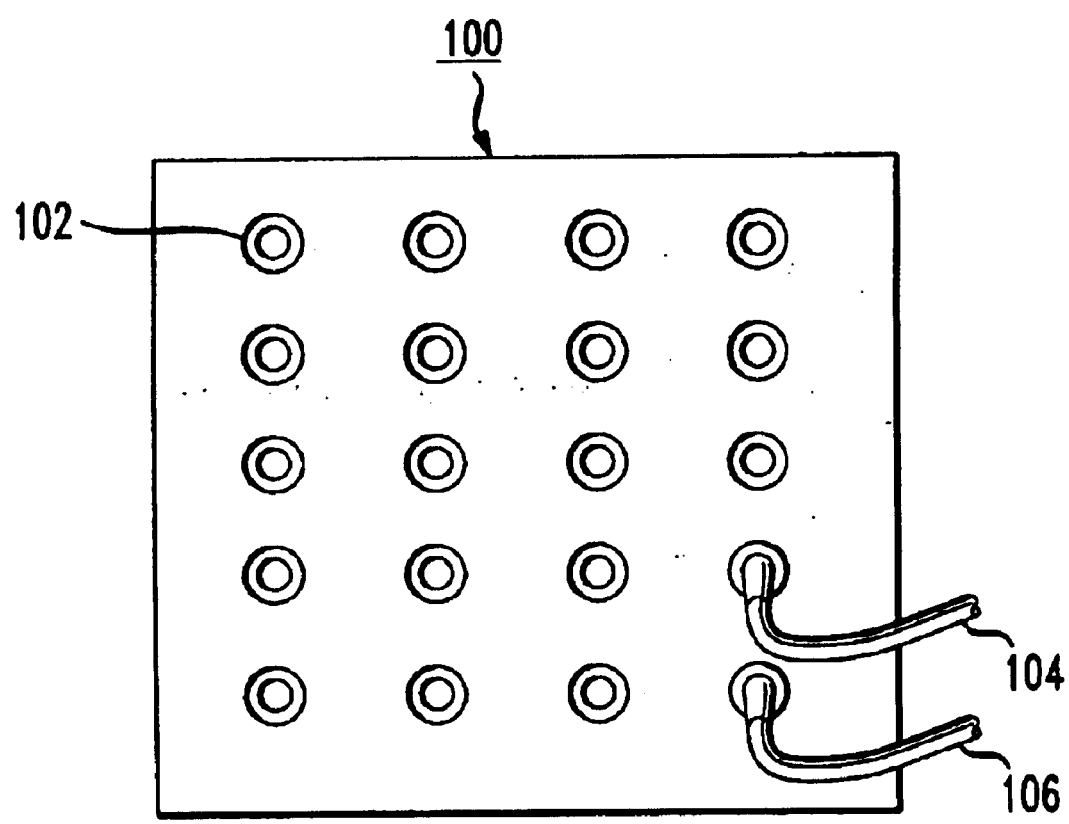
FIG. 1 displays a communications bay.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

In one embodiment of the present Invention, a method and apparatus of identifying and managing jumper cables, such as fiber jumper cables, is presented. Fiber cables are terminated in bays. Fiber cables connect communications electronics, which may also be located in the bay. Fiber jumper cables are used to connect (e.g. patch) the fiber cables to the communications electronics.

A fiber jumper includes a fiber pair, with a connector on each end. Fiber jumpers implemented in accordance with the teachings of the present invention may include ST connectors, however the teachings of the present invention are applicable to other types of cables and cable termination technologies. In the method and apparatus of the present invention, the ST connector includes a radio-frequency identification (RFID) device known as a tag. The tag includes a memory such as an integrated circuit memory, which stores fiber jumper information. A technician may use a handheld radiating device, to radiate the RFID device and read the fiber jumper information that is stored in the memory. As such, using an RFID system (e.g. tag and radiating device), the technician is able to identify the fiber jumper and properly configure the fiber jumper in a bay.

An RFID system used in the method and apparatus of the present invention includes three components, a transponder, which is commonly, referred to as a Radio Frequency (RF) tag or tag, an antenna or coil and a transceiver (with a computer). The tag is electronically programmed with unique information. For example in the method and apparatus of the present invention, the tag stores jumper cable information. The antenna and transceiver are in the radiating unit and the tag and associated memory are located in the ST connector. The antenna emits signals that penetrate the ST connector and impact the tag. The signals activate the tag and cause the reading and writing of the memory associated with the tag. The antenna serves as a conduit between the tag located in the connector and the transceiver located in the radiating unit. The transceiver along with a decoder (e.g. computer) located in the radiating unit, facilitates data acquisition, computation and communications.

In an RFID system the tag is radiated by an electromagnetic field (EM), which is often called an RFID field. The RFID field is communicated out of the antenna of the radiating unit. The radiating unit may be a stationary or a handheld mobile unit. When the tag is radiated by the electromagnetic field, the tag communicates information (e.g. jumper information) to the radiating unit and the Information is displayed on the radiating unit. In this way the radiating unit functions as a tag reader. One example of a radiating unit includes the Workabout scanner, which is a trademark of Psion Industrial PLC.

RFID tags are categorized as either active or passive. The tag may be made from a combination of inductive and capacitive elements, such as an inductive coil and a capacitor; or a magnetic material. A passive tag is powered by the electromagnetic field, which propagates out of the antenna, of the radiating unit. Tags implemented in accordance with the teachings of the present invention may include an integrated circuit (IC) that stores data, such as jumper information. In one embodiment of the present invention, when the tag is energized by an RFID field, the IC steps through each memory location and transmits the stored data to the radiating unit (e.g. reader). The tag has a size of about 1 inch in length by about ⅕ of an inch in width. In addition, the memory has a storage size of about 224 bits. However, it should be appreciated that the teachings of the present invention may be applied to tags of different sizes and memories with different storage capacities.

Active RFID tags are powered by an internal battery and include a memory, which may have read and write capability. As such, data, such as jumper information may be rewritten and/or modified during operation. In addition, write once tags are also available. The memory size of an active tag varies depending on the RFID system application. For example, active tags are available that have 1 megabyte of memory. Some active RFID tags have built-in batteries that allow them to record and transmit data without an EM field. It should be appreciated that while specific active tags are discussed, various active tags may be used without departing from the scope of the present invention.

Passive RFID tags operate without a separate external power source and obtain operating power from the radiating unit. Therefore a radiating unit typically radiates (e.g. energizes) a passive tag, at which point the tag is charged by the EM field and communicates any information stored in the memory, to the radiating unit. When operating in this manner the radiating unit functions as a tag reader.

There are a variety of passive tags, such as read/write tags and read-only tags. In one embodiment, a read-only tag may be programmed with a unique set of data (usually 32 to 128 bits) that cannot be modified. In another embodiment, a read-only tag may be radiated and the jumper information may be used as indexing information to reference a database; in the same way that a bar code would be used as an index into a database.

The antenna emits signals to activate the tag, so that the tag can be read from and written to. Antennas are the conduits between the tag and the transceiver that control the system's data acquisition and communications. Antennas are available in a variety of shapes and sizes. The antenna may be placed in a static location or may be placed on a mobile device. For example an antenna may be mounted on a communications bay, on an apparatus that has proximity to the communications bay, or an antenna may be placed on a mobile device.

The antenna may be combined with a transceiver and a computer/decoder to become a reader, which can be configured as a mobile device or a static device. The reader emits radio waves in ranges of anywhere from one inch to 100 feet or more, depending upon its power output and the radio frequency used. When an RFID tag passes through the electromagnetic area radiated by the reader, the tag detects the reader's activation signal. The reader then decodes the data encoded in the tag's integrated circuit memory. In one embodiment of the present invention, the data may be processed using a computer in the reader. In another embodiment of the present invention, the data may be passed to a host computer for further processing.

RFID systems may operate in low, intermediate and high frequency ranges. The operational range of the RFID system, impacts the operation of the system, such as the reading range and reading speed. For example, low-frequency systems in the range of 30 KHz to 500 KHz are available. Systems with intermediate frequency ranges of from 10–15 MHZ are available. Lastly, high-frequency systems which operate between 850 MHz to 950 MHz and 2.4 GHz to 2.5 GHz are available. The high frequency systems offer long read ranges greater than 90 feet and high reading speeds. In the method and apparatus of the present invention a low frequency range is used, however, an intermediate or high frequency range may be used and still remain within the scope of the present invention.

FIG. 1 displays a picture of a cabinet or bay 100. A bay 100 may include communications equipment that is connected to long-haul cables extending to different locations. Each bay may include several rows or columns of receptors 102 for inserting ST connectors. In addition, co-located bays such as 100, may serve as a termination points for communications to different locations. For example a first bay may serve as a termination point for communications to Georgia and a second bay may serve as a termination point for communications to New York. In addition, different receptacles may correspond to different locations. For example, one receptacle in a bay that serves as a termination point for Georgia, may be a patch to Atlanta. A second receptacle located in the same bay may provide a connection to Macon. In FIG. 1, jumpers are represented by items 104 and 106. ST connectors (not shown) are located at the end of the jumpers (104, 106) and are inserted into the receptacles 102.

Figure 2:
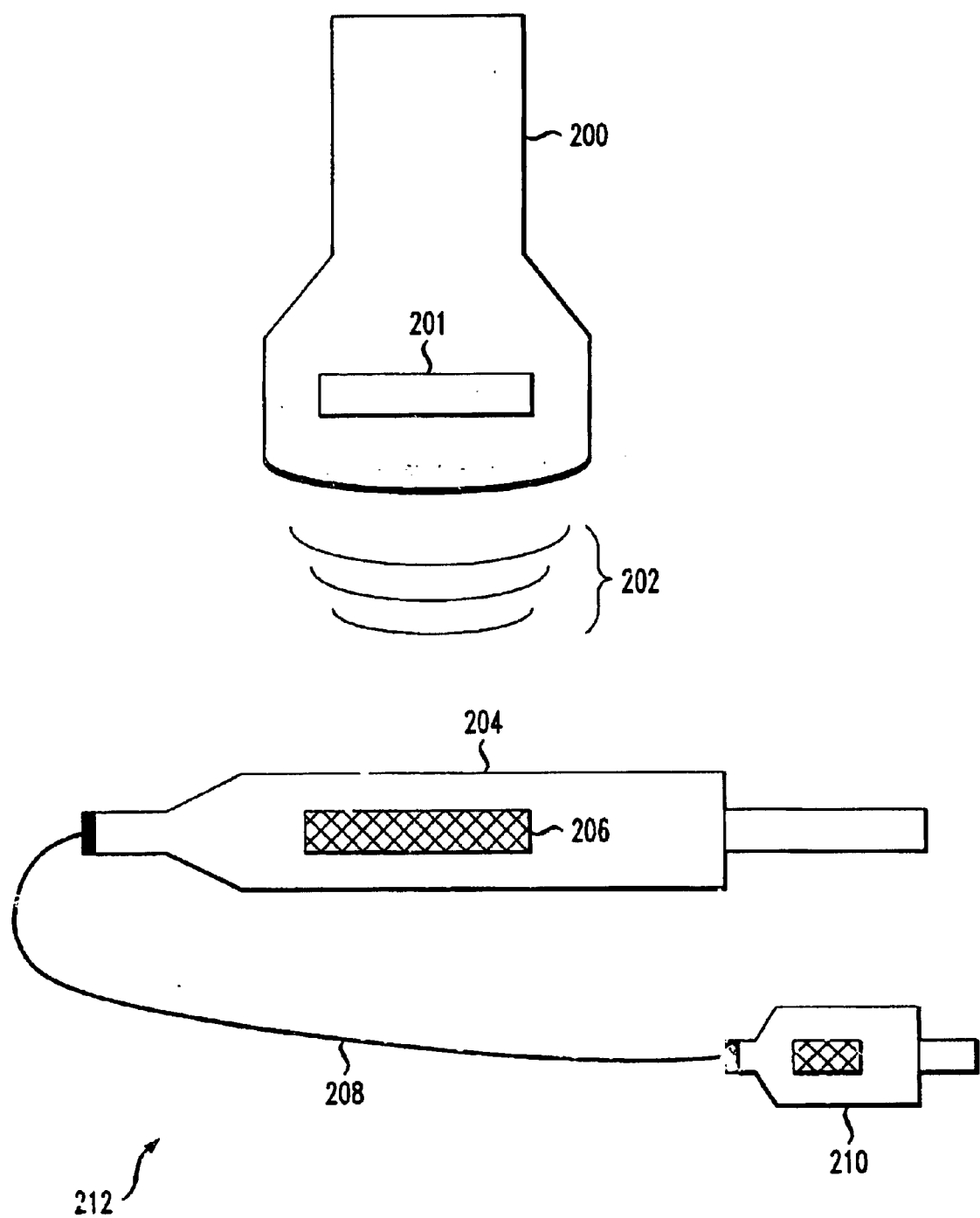
FIG. 2 displays a system implementing the method and apparatus of present invention.

FIG. 2 displays a system implementing the method and apparatus of the present invention. In FIG. 2 a radiating unit (e.g. reader) 200 is shown. The radiating unit 200 is an RFID unit. The radiating unit 200 includes an antenna, a transceiver and a computer (e.g. decoder logic). Electromagnetic waves 202 are transmitted through the antenna. A transceiver (e.g. transmitter/receiver) located within the radiating unit 200, generates programmed information and then receives jumper information in returned. A computer located in the radiating unit 200 then processes the jumper information. The computer may process the jumper information by decoding the information, using the information as an index to access a database or run computer instructions to further analyze the jumper information. Computation or processing of the information read from the tag, is within the scope of the present invention, whether the information is jumper information or another type of information.

A first connector is shown as 204. In one embodiment of the present invention, a connector, such as an ST connector, is used to terminate a fiber-optic cable. The connector includes a tag 206. In one embodiment of the present invention, the tag 206 is a passive tag and includes an integrated circuit memory, which is capable of storing information.

In FIG. 2 a jumper 212 is shown. The jumper 212 includes a first connector 204, on one end of a fiber cable 208, and a second connector 210 on the other end of the fiber cable. The fiber cable 208 is typically implemented with a transmitter/receiver pair of fibers. The jumper 212 is used to connect communications links between bays or within a bay.

In the method and apparatus of the present invention, the radiating unit 200 radiates the tag 206 located in the connector 204. Once radiated, the tag 206 is charged (e.g. energized) and communicates information stored in a memory associated with the tag 206, to the radiating unit 200. The radiating unit 200 receives this information and then processes the information.

The radiating unit 200 (e.g. reader) may include a computer that performs computations on the information (e.g. jumper information) communicated from the tag 206. In addition, the radiating unit 200 may include a database for performing a table look-up based on the information communicated from the tag. In one embodiment, the information communicated from the tag would serve as an index into a database. Further the radiating unit 200 may communicate with a second unit; and processing may be performed in the second unit, based on the information received from the tag. Lastly, the radiating unit may be a mobile unit or a static unit. If the radiating unit is a static unit, the radiating unit may be positioned in the bay or In close proximity to the bay. As such, a technician may use the static unit, positioned in the bay, to radiate the tag.

A tag such as an Electrically Erasable Programmable Read only Memory (EEPROM) manufactured by 3M Corporation may be used in the method and apparatus of the present invention. Many EEPROMs include both a read and write mode of operation. Information may be written to the tag when the tag is in write mode and may be read from the tag when the tag is in read mode. As such, data associated with the method and apparatus of the present invention is written into the tag when the tag is in write mode and the tag is deployed into the field, in read mode. However, the tag may also be deployed in write mode so that information may be written to the tag and read from the tag in real-time, when a technician is working in the field.

During operation, such as a reconfiguration, troubleshooting or some other type of operation; a technician may remove a number of ST connectors from their receptacles. When the technician wants to re-insert the ST connector back into the same receptacle or into a different receptacle, the RFID system may be used to identify the jumper. The technician will use the radiating unit 200 to energize the tag. Once the tag 206 is energized, the tag 206 will communicate information stored In the tag 206, back to the radiating unit 200. If further processing of the information is required, the radiating unit 200 will process the information.

Once processing is complete, information may be displayed on a screen 201, in the radiating unit 200. For example, the display information may be identification information, which notifies the technician of the location to place the jumper cable. Based on the information displayed on the screen 201, the technician may re-insert the ST connector in the proper receptacle, in the correct bay.

In the method and apparatus of the present invention, several types of information may be stored in the tag. For example, formatting information, route name information, Point of interest (POI) category information, POI number information, Message code information, Parameter information, Global Positioning System (GPS) Latitude & Longitude information and free text may all be stored in the tag.

In one embodiment of the present invention, the memory in the tag may store about 224 bits of information (e.g. jumper information). As such, a number of different types of jumper information may be stored in the tag. For example, formatting information may be stored in the tag. The formatting information represents format and control data and is 32 bits. Route name information may be stored in the tag. The route name information is a name given to a specific route and is 11 bits. Point of Interest information may be stored in the tag. For example, a POI category, represents an index, which causes the radiating unit (e.g. reader) to perform a database lookup for Point of Interest information and is 3 bits. A POI number may be stored. The POI number is a POI identification number and is 16 bits. A message code may be stored. The Message code parameter is an alarm message code, which provides alarm information and is 7 bits. GPS latitude and longitude information may be stored. The GPS latitude and longitude, conveys latitude and longitude information at 1-meter resolution and is 48 bits. A text area may be stored in the memory. For example, the text area, is a memory space, that is open for free or miscellaneous text and is 102 bits. It should be appreciated that the tag size and content is only demonstrative and different tag sizes and/or content may be implemented, without departing from the spirit of the present invention.

In addition to analyzing one connector, in another embodiment of the present invention, the operator may sequentially scan through a number of connectors, radiating each connector and identifying each connector, to determine the location of each connector. The connectors may then be placed in the appropriate receptacle. In an alternative, connectors may be parsed to identify and then categorize or reconfigure various bays or jumpers. A number of different processes for identifying and analyzing connectors may be used and still remain within the scope of the present invention. For example, the reader may be mounted in a bay or in close proximity. As a result, the technician does not have to carry a handheld unit and may be able to process the identify jumpers using the reader in the bay.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A fiber-optic termination device comprising:
   a fiber optic connector;
   a transponder attached to the connector and receiving a signal; and
   a memory storing information and coupled to the transponder, the memory communicating the information to the transponder, in response to the transponder receiving the signal, the information including at least one data type selected from the group consisting of formatting information, point of interest category information, route name information, message code information and GPS location information; and
   the transponder responding to the signal with the information communicated by the memory.

2. An apparatus as set forth in claim 1, wherein the transponder is a radio-frequency identification transponder.

3. An apparatus as set forth in claim 1, wherein the memory further comprises memory locations and each memory location is accessed in response to the transponder receiving the signal.

4. An apparatus as set forth in claim 1, wherein the signal is an electromagnetic signal.

5. A method of operating a fiber connector comprising the steps of:
   receiving electromagnetic waves in the fiber connector, the fiber connector including a tag, the tag including a memory associated therewith, the memory storing information, the information including at least one data type selected from the group consisting of formatting information, point of interest category information, route name information, message code information and GPS location information;
   energizing the tag in response to receiving the electromagnetic waves;
   accessing the memory in response to energizing the tag; and
   communicating the information in response to accessing the memory.

6. A method of identifying a jumper comprising the steps of:
   directing signals toward a connector to the jumper, the connector including a tag with a memory associated therewith, the memory storing information, wherein the tag is energized in response to receiving the signals and information is communicated from the memory in response to energizing the tag, the information including at least one data type selected from the group consisting of formatting information, point of interest category information, route name information, message code information and GPS location information;
   receiving the information communicated from the tag; and
   displaying the information in response to receiving the information communicated from the tag.

7. An apparatus for terminating optical fiber cables, comprising:
   a communications equipment bay;
   at least one fiber optic termination device receptor attached to the bay;
   a static radiating unit positioned in the bay, the radiating unit being configured to transmit a first radio frequency signal and to receive and decode information contained in a received second radio frequency signal;
   at least one fiber-optic termination device mounted in a corresponding fiber optic termination device receptor, the termination device comprising a transponder for receiving the first radio frequency signal and a memory storing information and coupled to the transponder, the memory communicating the information to the transponder for encoding in the second signal in response to the transponder receiving the first signal.

8. The apparatus of claim 7, wherein the transponder is a passive RFID tag powered by the first radio frequency signal.

9. The apparatus of claim 7, wherein the transponder is an active RFID tag, and said termination device further comprises a power supply for the transponder.

10. The apparatus of claim 7, wherein the information stored in the memory includes jumper information.

11. The apparatus of claim 10, wherein the jumper information includes at least one data type selected from the group consisting of formatting information, point of interest category information, route name information, message code information and location information.

12. The apparatus of claim 7, further comprising a computer connected to the radiating unit for processing the information.

* * * * *